United States Patent
Mizuta et al.

(10) Patent No.: US 10,173,742 B2
(45) Date of Patent: Jan. 8, 2019

(54) REAR PORTION STRUCTURE OF SADDLE-RIDE TYPE VEHICLE

(71) Applicant: HONDA MOTOR CO., LTD., Tokyo (JP)

(72) Inventors: Koji Mizuta, Wako (JP); Jun Hirose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/452,401

(22) Filed: Mar. 7, 2017

(65) Prior Publication Data

US 2017/0282991 A1 Oct. 5, 2017

(30) Foreign Application Priority Data

Mar. 30, 2016 (JP) .................................. 2016-067857

(51) Int. Cl.
| | | |
|---|---|---|
| *B62J 1/00* | (2006.01) | |
| *B62K 11/02* | (2006.01) | |
| *B62J 6/04* | (2006.01) | |
| *B62J 17/00* | (2006.01) | |
| *B62J 17/02* | (2006.01) | |

(52) U.S. Cl.
CPC .................. *B62K 11/02* (2013.01); *B62J 1/00* (2013.01); *B62J 6/04* (2013.01); *B62J 17/00* (2013.01); *B62J 17/02* (2013.01)

(58) Field of Classification Search
CPC ............... B62J 15/00; B62J 1/14; B62J 17/00
See application file for complete search history.

(56) References Cited

U.S. PATENT DOCUMENTS

| | | | | |
|---|---|---|---|---|
| 6,588,529 | B2 * | 7/2003 | Ishii | .......................... B62J 17/00 180/219 |
| 7,448,663 | B2 * | 11/2008 | Fujimoto | ............... B62H 5/006 292/150 |

(Continued)

FOREIGN PATENT DOCUMENTS

| | | |
|---|---|---|
| CN | 103481976 B | 12/2015 |
| EP | 2743160 A1 | 6/2014 |

(Continued)

OTHER PUBLICATIONS

Extended European Search Report for European Application No. 17159329.6, dated Oct. 6, 2017.

*Primary Examiner* — Joseph M Rocca
*Assistant Examiner* — Michael R Stabley
(74) *Attorney, Agent, or Firm* — Birch, Stewart, Kolasch & Birch, LLP

(57) ABSTRACT

One embodiment provides a rear portion structure of a saddle-ride type vehicle. The structure includes: seat frames inclined rearward and upward and supporting a riding seat; and a rear cowl having an upper cowl and a lower cowl. The upper cowl includes: a first cowl; and a second cowl which is connected to the first cowl and forms an opening upper edge portion of an opening for exposing a tail light. The lower cowl includes: a third cowl; and a fourth cowl which is connected to the third cowl and forms an opening lower edge portion of the opening. An approximately-U-shaped recessed portion is opened at a rear end of the third cowl. The fourth cowl forms the opening lower edge portion while covering the U-shaped recessed portion.

6 Claims, 11 Drawing Sheets

(56) References Cited

U.S. PATENT DOCUMENTS

| | | | | |
|---|---|---|---|---|
| 7,559,679 B2* | 7/2009 | Isayama | ............ | B60Q 1/44 |
| | | | | 362/522 |
| 7,651,112 B2* | 1/2010 | Ozawa | ............ | B62J 1/28 |
| | | | | 180/219 |
| 7,798,509 B2* | 9/2010 | Ohzono | ............ | B62J 6/04 |
| | | | | 280/152.05 |
| 7,857,341 B2* | 12/2010 | Kobayashi | ............ | B62J 27/00 |
| | | | | 180/219 |
| 8,297,688 B2* | 10/2012 | Kanezuka | ............ | B62J 17/00 |
| | | | | 296/193.08 |
| 9,233,727 B1* | 1/2016 | Imamura | ............ | B62J 15/00 |
| 9,849,929 B2* | 12/2017 | Ito | ............ | B62J 6/04 |
| 9,902,313 B2* | 2/2018 | Taguma | ............ | B60Q 1/2661 |
| 2007/0045023 A1* | 3/2007 | Okabe | ............ | B62J 1/12 |
| | | | | 180/218 |
| 2007/0230198 A1* | 10/2007 | Ohzono | ............ | B60Q 1/50 |
| | | | | 362/459 |
| 2009/0008893 A1* | 1/2009 | Ishikawa | ............ | B62J 6/18 |
| | | | | 280/152.3 |
| 2009/0114466 A1* | 5/2009 | Nishijima | ............ | B62J 15/00 |
| | | | | 180/219 |
| 2012/0320612 A1* | 12/2012 | Yamakura | ............ | B62J 6/005 |
| | | | | 362/473 |
| 2014/0167386 A1 | 6/2014 | Tako et al. | | |

FOREIGN PATENT DOCUMENTS

| | | | | |
|---|---|---|---|---|
| EP | 2781441 A1 | 9/2014 | | |
| JP | 2004-224176 A | 8/2004 | | |
| JP | 2014-240255 | * 12/2014 | ............ | B62J 11/00 |
| JP | 5782424 B2 | 9/2015 | | |
| WO | WO 2011/001443 A2 | 1/2011 | | |

* cited by examiner

REAR PORTION STRUCTURE OF SADDLE-RIDE TYPE VEHICLE

CROSS-REFERENCE TO RELATED APPLICATION(S)

This application claims priority from Japanese Patent Application No. 2016-067857 filed on Mar. 30, 2016, the entire contents of which are incorporated herein by reference.

FIELD

The present invention relates to a rear portion structure of a saddle-ride type vehicle, and more particularly to a rear portion structure of a saddle-ride type vehicle having a rear cowl which is configured to surround a periphery of a tail light disposed on a rear end of the vehicle.

BACKGROUND

For example, JP-5782424-B discloses a rear portion structure of a saddle-ride type vehicle, where an outer periphery of a tail light is surrounded by a rear end portion of a rear cowl as viewed in a back view of a vehicle.

As disclosed in JP-5782424-B, in the structure where the tail light is surrounded by a rear end portion of a rear cowl, the structure of a rear end portion of rear cowl has a shape which traces a profile of the tail light as viewed in a back view. As a result, each time the tail light is changed to a different type, it is necessary to adjust the rear portion structure of the vehicle to the tail light by changing the structure of the rear cowl. That is, the profile of the tail light forms a shape of a rear portion of the vehicle.

However, there has been a demand for lowering a manufacturing cost and hence, it is desirable to provide the structure where the rear portion structure of the vehicle can be used as it is without modification as much as possible even when the tail light is changed in shape due to a change in a type of vehicle, for example.

SUMMARY

One object of the present invention to provide a rear portion structure of a saddle-ride type vehicle which can suppress influence caused by a shape of a tail light.

To achieve the above-mentioned object, the invention provides following Aspects 1-7.

1. A rear portion structure of a saddle-ride type vehicle including:
    seat frames inclined rearward and upward toward a rear side of the vehicle and supporting a riding seat;
    a tail light supported on rear ends of the seat frames; and
    a rear cowl having an upper cowl which covers upper surfaces of the seat frames disposed below a rear portion of the riding seat and a lower cowl which covers lower surfaces of the seat frames,
    wherein the upper cowl includes: a first cowl; and a second cowl which is connected to a rear side of the first cowl and forms an opening upper edge portion of an opening through which the tail light is exposed,
    wherein the lower cowl includes: a third cowl; and a fourth cowl which is connected to a rear side of the third cowl and forms an opening lower edge portion of the opening,
    wherein the first cowl and the third cowl are connected to each other by a vertical connecting portion which extends in a longitudinal direction of the vehicle,
    wherein a U-shaped recessed portion having an approximately U shape which is opened at a rear end thereof as viewed in a side view is formed on the third cowl below the vertical connecting portion, and
    wherein the fourth cowl forms the opening lower edge portion while covering the U-shaped recessed portion as viewed in a side view.

2. The structure of Aspect 1,
    wherein the second cowl is formed in an edge shape such that the opening upper edge portion follows an upper edge of the tail light in shape as viewed in a back view,
    wherein the first cowl is configured such that the first cowl extends toward left and right outer sides and downward from first cowl left and right inner end portions disposed laterally outside of and adjacently to left and right ends of the second cowl thus forming left and right outermost portions as viewed in a back view,
    wherein the third cowl is configured such that the third cowl bulges laterally so as to be connected to the left and right outermost portions from third cowl left and right inner end portions disposed below and adjacently to the first cowl left and right inner end portions, and the U-shaped recessed portion expands in a vehicle width direction as the U-shaped recessed portion extends downward as viewed in a back view, and
    wherein the fourth cowl is configured such that the fourth cowl closes the U-shaped recessed portion while surrounding a lower edge and side edges of the tail light as viewed in a back view.

3. The structure of Aspect 1 or 2, further including
    a license stay which has a front end thereof supported by the seat frames, extends toward a rear side of the vehicle while passing through a through portion of the rear cowl, and supports a license plate on a rear end thereof,
    wherein the third cowl includes a third cowl connecting portion which extends in the vehicle width direction above the through portion of the license stay and has left and right portions thereof connected to each other.

4. The structure of any one of Aspects 1 to 3,
    wherein the third cowl includes a U-shaped recessed portion outer peripheral portion which is inclined toward an inner side from an outer side of the vehicle in a direction toward the U-shaped recessed portion on an outer periphery of the U-shaped recessed portion as viewed in a back view, and
    wherein the U-shaped recessed portion outer peripheral portion has a flat surface continuously formed with the U-shaped recessed portion via a ridge which surrounds the U-shaped recessed portion.

5. The structure of Aspect 4,
    wherein the fourth cowl has a rear exposed portion having an approximately U shape which is positioned in the U-shaped recessed portion, and is formed by left and right side wall portions and a bottom portion as viewed in a back view, and
    wherein a distance in a vehicle width direction between the left and right side wall portions is decreased toward a rear side of the vehicle from a front side of the vehicle.

6. The structure of Aspect 3,
    wherein the upper cowl is formed in an approximately straight line shape where an upper cowl upper portion extends in a longitudinal direction of the vehicle as viewed in a side view, wherein the lower cowl is formed in an approximately straight line shape where a lower cowl lower portion extends in the longitudinal direction of the vehicle, and a distance between the lower cowl lower portion and the upper cowl upper portion is decreased as the lower cowl lower portion extends toward a rear side of the vehicle as viewed in a side view, and wherein a lens outer surface of the tail light is disposed between the upper cowl upper portion and the lower cowl lower portion, and an upper end of the lens outer surface is disposed downward behind a lower end of the lens outer surface as viewed in a side view.

According to Aspect 1, the upper cowl includes: a first cowl; and a second cowl which is connected to a rear side of the first cowl and forms an opening upper edge portion of an opening through which the tail light is exposed, the lower cowl includes: a third cowl; and a fourth cowl which is connected to a rear side of the third cowl and forms an opening lower edge portion of the opening, and the first cowl and the third cowl are connected to each other by a vertical connecting portion which extends in a longitudinal direction of the vehicle and extend in the longitudinal direction of the vehicle. Accordingly, the upper cowl and the lower cowl can be favorably connected to each other. The U-shaped recessed portion having an approximately U shape where the rear end is opened as viewed in a side view is formed on the third cowl below the vertical connecting portion, and the fourth cowl forms the opening lower edge portion while covering the U-shaped recessed portion as viewed in a side view and hence, the most portion of the opening through which the tail light is exposed can be formed by the fourth cowl. As a result, it is possible to adjust the rear portion structure of the saddle-ride type vehicle to the shape of the tail light by merely changing the shape of the rear portion of the fourth cowl. As a result, the shape of the tail light can be easily changed.

According to Aspect 2, the second cowl is formed in an edge shape such that the opening upper edge portion follows an upper edge of the tail light in shape as viewed in a back view and hence, the tail light can be disposed at the high position. The first cowl is configured such that the first cowl extends toward left and right outer sides and downward from first cowl left and right inner end portions disposed laterally outside of and adjacently to left and right ends of the second cowl thus forming left and right outermost portions as viewed in a back view, the third cowl is configured such that the third cowl bulges laterally so as to be connected to the left and right outermost portions from third cowl left and right inner end portions disposed below and adjacently to the first cowl left and right inner end portions, and the U-shaped recessed portion expands in a vehicle width direction as the U-shaped recessed portion extends downward as viewed in a back view, and the fourth cowl is configured such that the fourth cowl closes the U-shaped recessed portion while surrounding a lower edge and side edges of the tail light as viewed in a back view. Accordingly, it is possible to adjust the rear portion structure of the vehicle to the shape of the tail light by merely changing a shape of a portion of the fourth cowl which surrounds the tail light and hence, the degree of freedom in selecting the shape of the tail light can be enhanced. The third cowl is disposed such that the third cowl appears on both left and right ends of the tail light as viewed in a back view and hence, design property of an external appearance of the rear portion structure of the saddle-ride type vehicle from a rear side can be enhanced.

According to Aspect 3, the third cowl includes the third cowl connecting portion which extends in the vehicle width direction above the through portion of the license stay and has left and right portions thereof connected to each other. Accordingly, the third cowl closes the opening of the rear cowl on a rear side thus preventing the intrusion of water. The third cowl connecting portion forms the integral structure by connecting the left and right portions of the third cowl in the vehicle width direction and hence, the number of parts can be decreased whereby assembling property of the third cowl is enhanced.

According to Aspect 4, the third cowl includes the U-shaped recessed portion outer peripheral portion which is inclined toward the inner side from the outer side of the vehicle in a direction toward the U-shaped recessed portion on the outer periphery of the U-shaped recessed portion as viewed in a back view, and the U-shaped recessed portion outer peripheral portion has the flat surface continuously formed with the U-shaped recessed portion via the ridge which surrounds the U-shaped recessed portion. Accordingly, design property of an external appearance of the rear portion structure of the saddle-ride type vehicle can be enhanced while enhancing the rigidity of the surrounding of the U-shaped recessed portion.

According to Aspect 5, the fourth cowl has a rear exposed portion having an approximate U shape which is positioned in the U-shaped recessed portion, and is formed by left and right side wall portions and a bottom portion as viewed in a back view, and a distance in a vehicle width direction between the left and right side wall portions is decreased toward a rear side of the vehicle from a front side of the vehicle. Accordingly, the rear portion of the fourth cowl which closes the U-shaped recessed portion can be formed into the structure having a narrow width whereby downsizing and reduction of weight of the lower cowl can be realized.

According to Aspect 6, the upper cowl is formed in an approximately straight line shape where an upper cowl upper portion extends in a longitudinal direction of the vehicle as viewed in a side view, the lower cowl is formed in an approximately straight line shape where a lower cowl lower portion extends in the longitudinal direction of the vehicle, and a distance between the lower cowl lower portion and the upper cowl upper portion is decreased as the lower cowl lower portion extends toward a rear side of the vehicle as viewed in a side view, and a lens outer surface of the tail light is disposed between the upper cowl upper portion and the lower cowl lower portion, and an upper end of the lens outer surface is disposed downward behind a lower end of the lens outer surface as viewed in a side view. Accordingly, the rear cowl can be formed in a tapered shape toward a rear side and hence, downsizing and reduction of weight of the rear cowl can be realized.

BRIEF DESCRIPTION OF DRAWINGS

FIG. 5A is a left side view. FIG. 5B is a plan view.

FIG. 6A is a plan view. FIG. 6B is a left side view.

FIG. 8A is a plan view. FIG. 8B is a left side view.

FIG. 10A is a plan view. FIG. 10B is a left side view.

DETAILED DESCRIPTION

Figure 1:
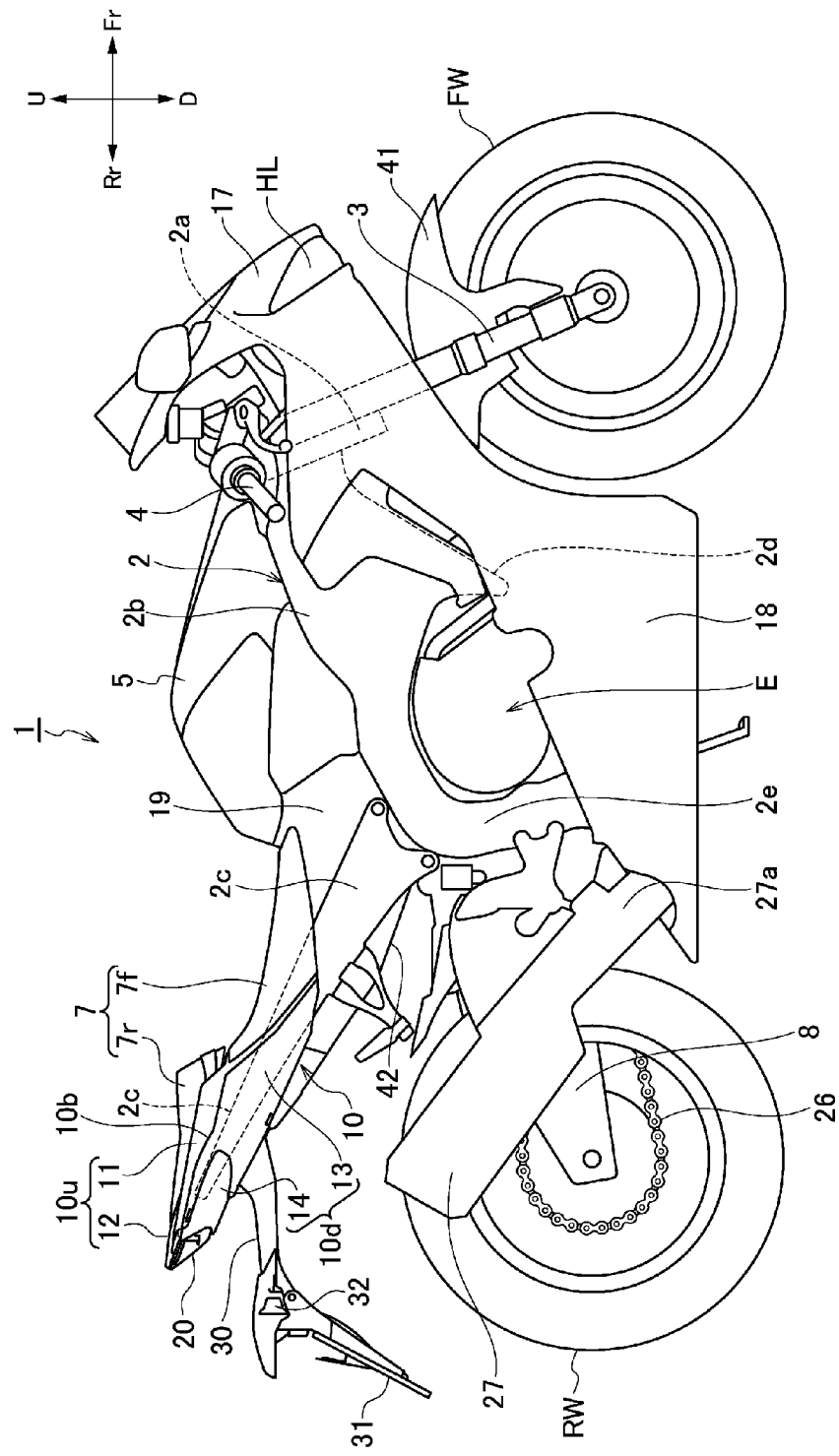
FIG. 1 is a right side view of a saddle-ride type vehicle according to an embodiment.

Hereinafter, a saddle-ride type vehicle according to an embodiment is described with reference to attached drawings. The drawings are viewed in the direction of symbols and, in the description made hereinafter, directions such as "front", "rear", "left", "right", "up" and "down" are described in accordance with directions as viewed from a rider. In the drawings, symbol Fr indicates a front side of the vehicle, symbol Rr indicates a rear side of the vehicle, symbol L indicates a left side of the vehicle, symbol R indicates a right side of the vehicle, symbol U indicates an upper side of the vehicle, and symbol D indicates a lower side of the vehicle.

In FIG. 1, a vehicle body frame 2 of a saddle-ride type vehicle 1 which is a motorcycle includes: a head pipe 2a which steerably supports a front fork 3 pivotally supporting a front wheel FW and a handle 4; a main frame 2b which extends rearward and downward from the head pipe 2a; a pivot frame 2e which is connected to a rear portion of the main frame 2b and extends downward; a pair of left and right seat frames 2c which is connected to the pivot frame 2e and is inclined rearward and upward; and a down frame 2d which is connected to a front end portion of the main frame 2b and extends rearward and downward at a steeper angle than the main frame 2b. A drive unit E which is formed of an engine and a transmission is disposed below the main frame 2b and in front of the pivot frame 2e. The drive unit E is mounted on the vehicle body frame 2 such that the drive unit E is surrounded by the main frame 2b, the down frame 2d and the pivot frame 2e. The drive unit E is supported by a lower end portion of the down frame 2d and the pivot frame 2e.

A fuel tank 5 is mounted on the main frame 2b. A tandem-type riding seat 7 formed of a rider's seat 7f on which a rider is seated and a pillion's seat 7r is supported by the seat frame 2c behind the fuel tank 5.

A front end portion of a swing arm 8 which pivotally supports a rear wheel RW at a rear end portion thereof is swingably supported by the pivot frame 2e, and the swing arm 8 is suitably supported by a rear cushion not shown in the drawing. Power from the drive unit E is transmitted to the rear wheel RW via a chain 26 extended along the swing arm 8. An exhaust pipe 27a which passes below the seat frame 2c and extends toward a rear side of the drive unit E from a front side of the drive unit E is connected to the drive unit E, and an exhaust muffler 27 connected to the exhaust pipe 27a is disposed on a right outside of the swing arm 8.

A cover member which covers a vehicle body is formed of resin molded bodies which cover the vehicle as desired. For example, the cover member includes: a front cowl 17 which covers side surfaces of an upper portion of the front fork 3 from surrounding of a head light HL; an under cowl 18 which is continuously formed with the front cowl 17 and covers a lower portion of the drive unit E from a rear side of the front fork 3 and a front side of the drive unit E; side cowls 19 which cover an area ranging from a lower side of the fuel tank 5 and a lower side of a front portion of the rider's seat 7f to upper portions of the main frame 2b and the seat frame 2c; a rear cowl 10 which is disposed on a rear portion of the vehicle such that the rear cowl 10 covers the surrounding area of a tail light 20 while surrounding side surfaces and a lower surface of the seat frame 2c from below a rear portion of the rider's seat 7f; a front fender 41 which covers the front wheel FW from above; and a rear fender 42 which covers the rear wheel RW from above. The tail light 20 is supported by the rear end of the rear fender 42. Below the tail light 20, a license stay 30 is supported as desired by the seat frame 2c and extends toward a rear side in the longitudinal direction of the vehicle, and a license plate 31 and the blinker 32 are supported on a rear end of the license stay 30.

Figure 2:
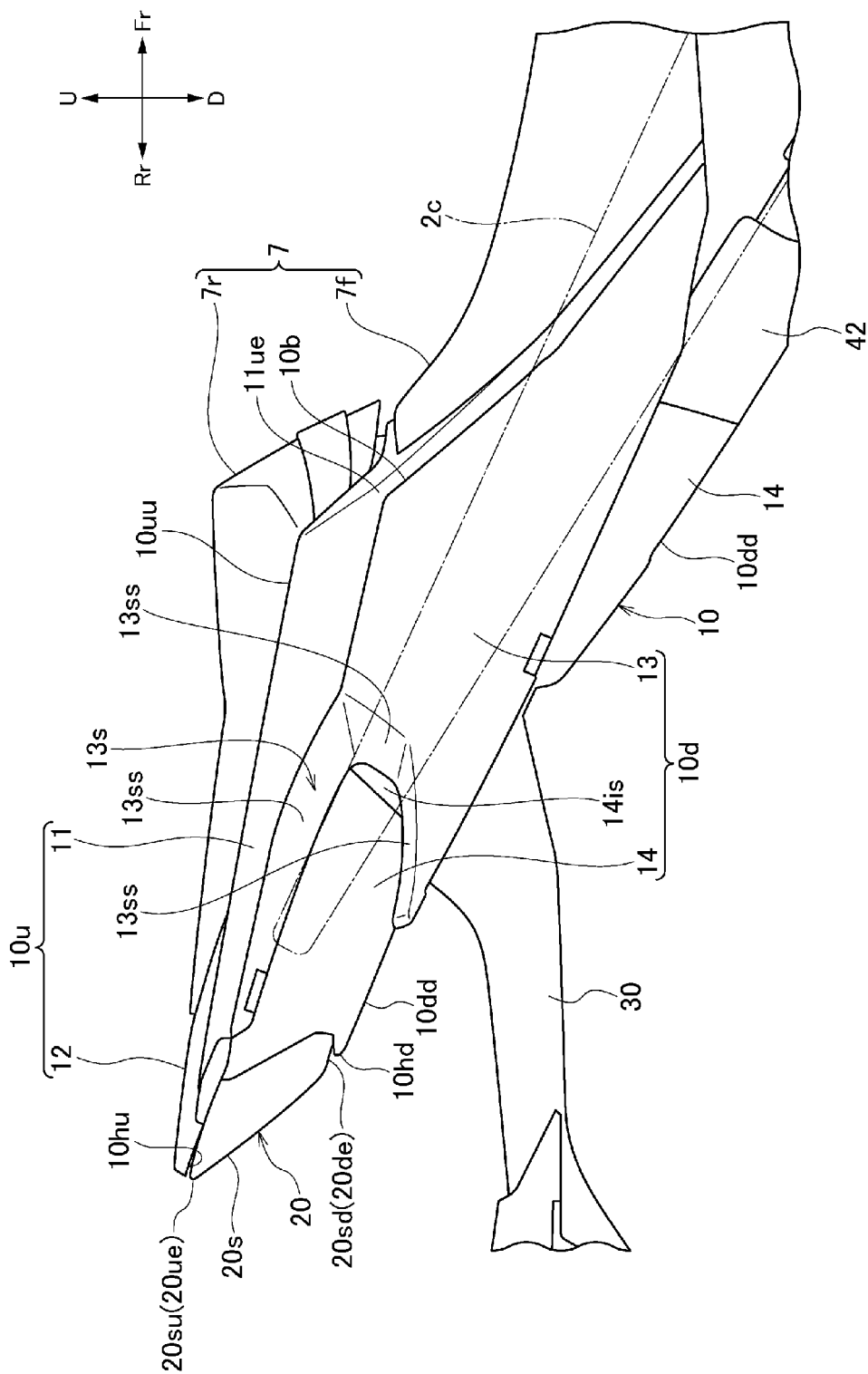
FIG. 2 is an enlarged right side view showing a rear portion of the saddle-ride type vehicle shown in FIG. 1 in an enlarged manner.
Figure 3:
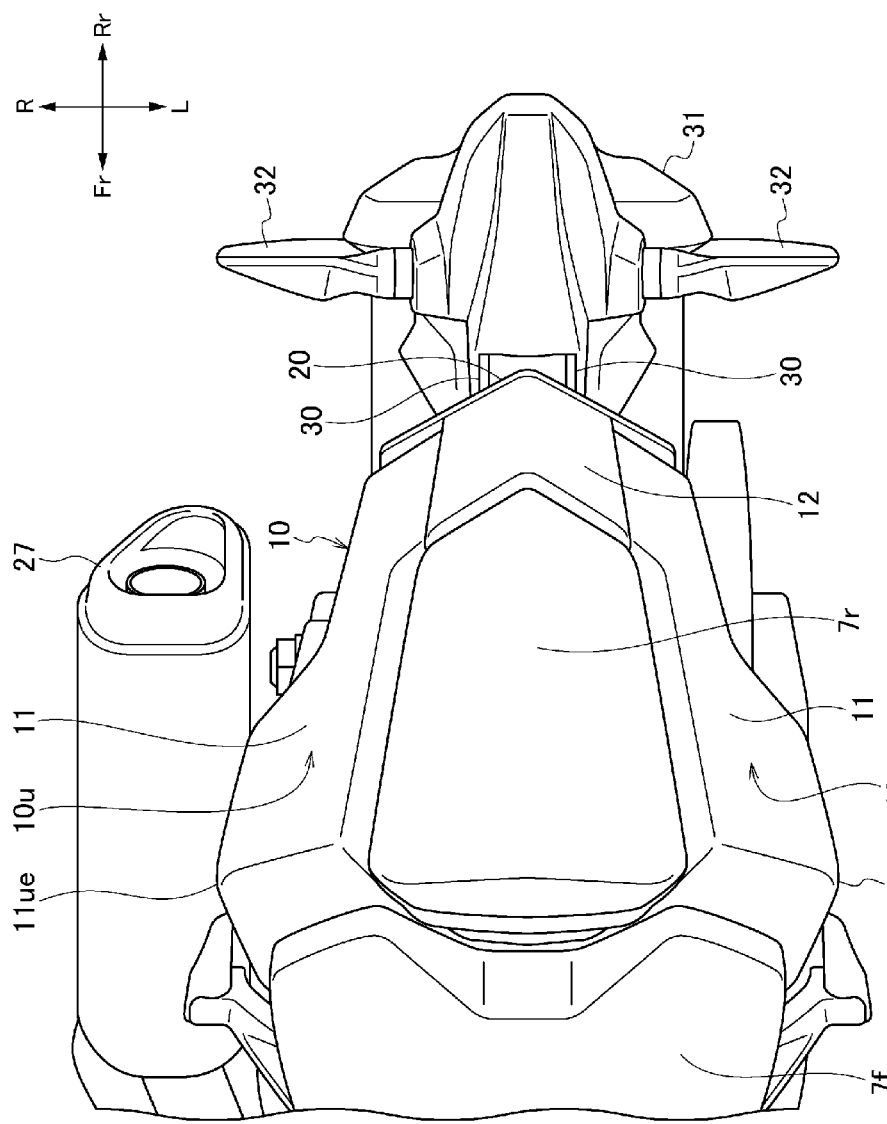
FIG. 3 is an enlarged plan view showing the rear portion of the saddle-ride type vehicle shown in FIG. 1 in an enlarged manner.

As shown in FIG. 2 and FIG. 3, to roughly classify the rear cowl 10, the above-mentioned rear cowl 10 is formed of an upper cowl 10u on an upper side and a lower cowl 10d on a lower side. To be more specific, the upper cowl 10u extends from a lower side of a rear portion of the rider's seat 7f to a rear side of the pillion's seat 7r so as to cover upper surfaces of the seat frames 2c (see FIG. 3). The low cowl 10d is formed so as to cover lower surfaces and side surfaces of the seat frames 2c. The upper cowl 10u and the lower cowl 10d are vertically assembled along a vertical connecting portions 10b which extend in the longitudinal direction (see FIG. 2).

The upper cowl upper portion 10uu of the upper cowl 10u is formed into an approximately straight line shape as viewed in a side view where the upper cowl upper portion 10uu extends slightly rearward and upward. The lower cowl lower portion 10dd of the lower cowl 10d is formed into an approximately straight line shape as viewed in a side view where the lower cowl lower portion 10dd extends rearward and upward at a steeper angle than the upper cowl upper portion 10uu. That is, the lower cowl lower portion 10dd is configured such that the closer the lower cowl lower portion 10dd to the rear side of the vehicle, the smaller a distance between the lower cowl lower portion 10dd and the upper cowl upper portion 10uu is (see FIG. 2).

An upper end 20su of a lens outer surface 20s of the tail light 20 is positioned on an extension of the upper cowl upper portion 10uu toward a rear side, and a lower end 20sd of the lens outer surface 20s of the tail light 20 is positioned on an extension of the lower cowl lower portion 10dd toward a rear side. That is, the lens outer surface 20s of the tail light 20 is disposed between the upper cowl upper portion 10uu and the lower cowl lower portion 10dd as viewed in a side view. The direction of the tail light 20 is disposed downward such that the upper end 20su of the lens outer surface 20s is disposed behind the lower end 20sd of the lens outer surface 20s (see FIG. 2).

Hereinafter, the upper cowl 10u and the lower cowl 10d are described with reference to FIG. 4 to FIG. 10B. The upper cowl 10u is shown in FIG. 4 to FIG. 6B, and the lower cowl 10d is shown in FIG. 7 to FIG. 10B.

The upper cowl 10u includes a first cowl 11, and a second cowl 12 connected to a rear side of the first cowl 11.

Figure 4:
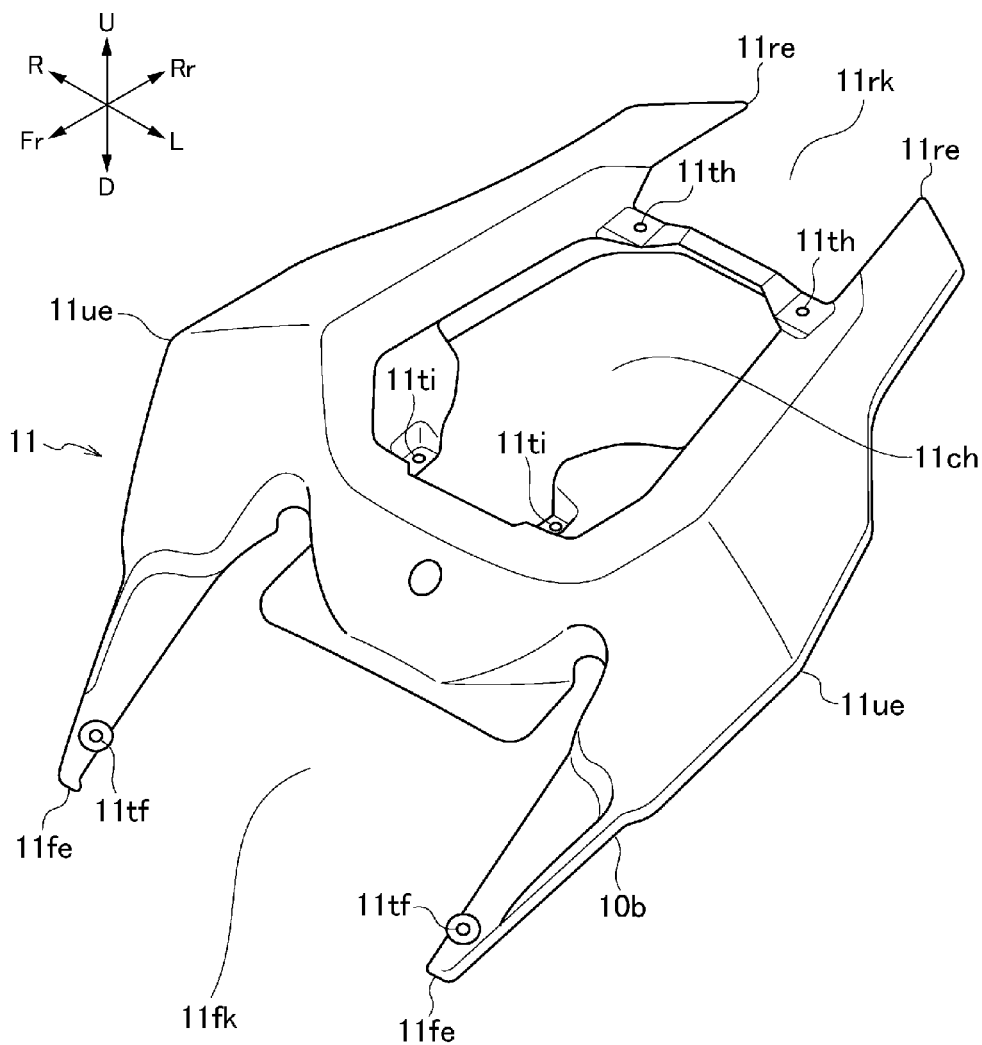
FIG. 4 is a perspective view of a first cowl which forms an upper cowl of a rear cowl of the saddle-ride type vehicle shown in FIG. 1 as viewed from an oblique upper position.

As shown in FIG. 4, the first cowl 11 has the left-and-right symmetrical structure. That is, the first cowl 11 has: a front notched portion 11*fk* which is notched such that the front notched portion 11*fk* largely opens toward a front side; and a rear notched portion 11*rk* which is notched toward a rear side such that the rear notched portion 11*rk* opens rearward smaller than the front notched portion 11*fk*, and a center opening 11*ch* is formed in the first cowl 11 between both notched portions 11*fk*, 11*rk*. A rear portion of the rider's seat 7*f* is placed on the front notched portion 11*fk* from above such that the rear portion of the rider's seat 7*f* closes the front notched portion 11*fk*. The pillion's seat 7*r* is placed on the center opening 11*ch* from above such that the pillion's seat 7*r* closes the center opening 11*ch*. The second cowl 12 is mounted on the rear notched portion 11*rk* such that the second cowl 12 closes the rear notched portion 11*rk* (see FIG. 5A).

Figure 5A:
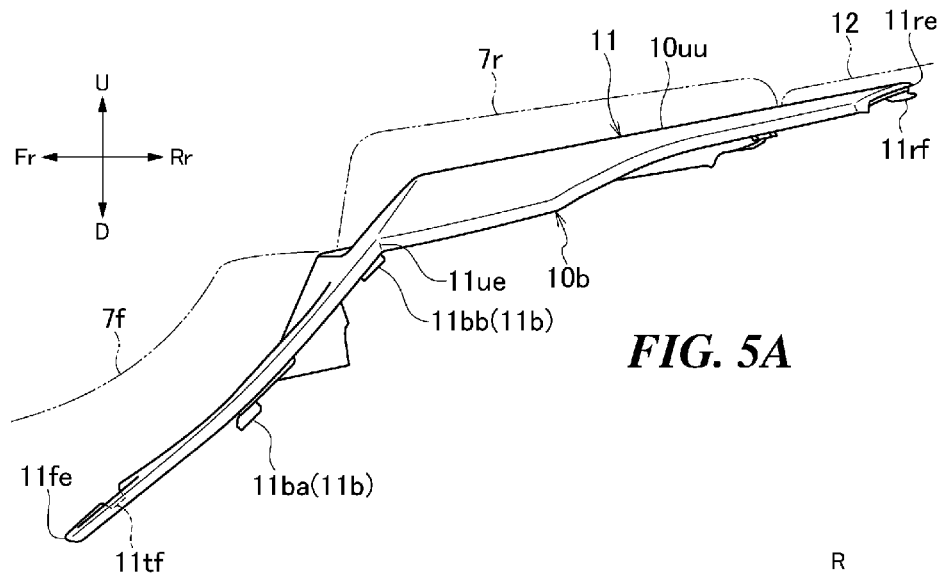
FIGS. 5A and 5B are views of the first cowl shown in FIG. 4.
Figure 5B:
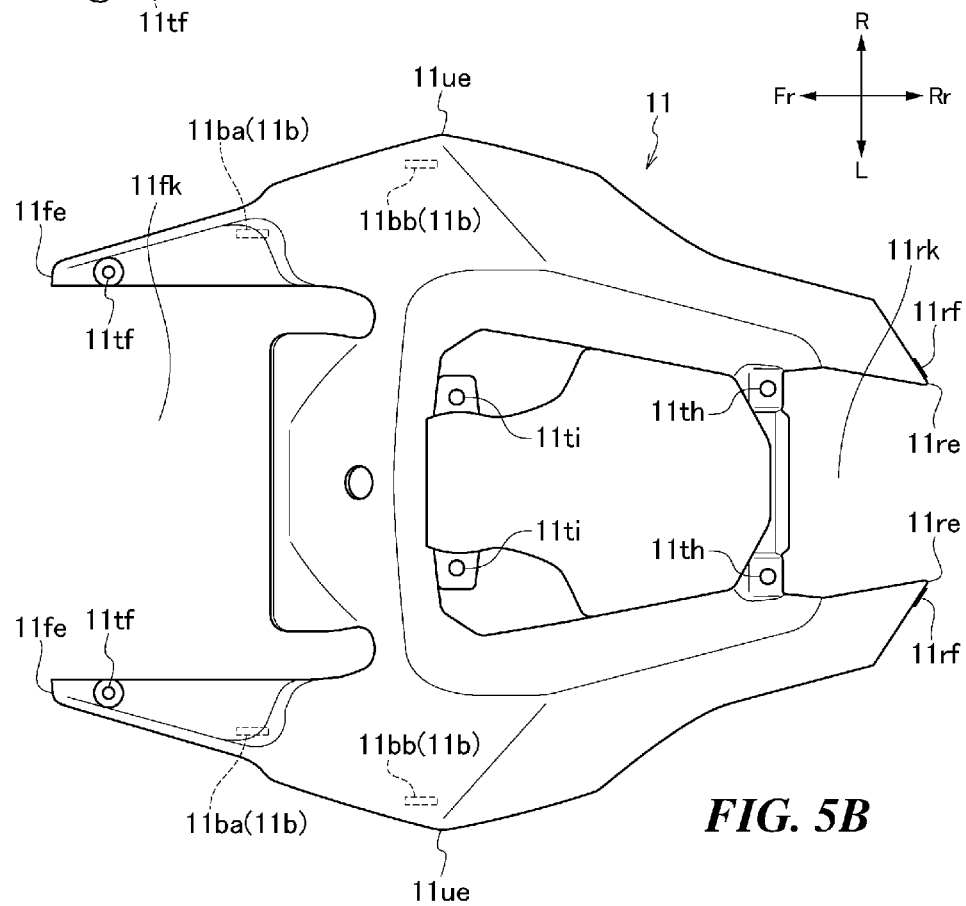

As shown in FIGS. 5A and 5B, in the first cowl 11, first cowl front ends 11*fe* which are disposed on both left and right sides of the front notched portion 11*fk* are positioned below an intermediate portion of the rider's seat 7*f* in the longitudinal direction of the vehicle. As viewed in a plan view, left and right outermost portions 11*ue* are formed on both left and right sides of the first cowl 11 as portions having a largest width in the lateral direction. A width of the first cowl 11 is gradually increased toward a rear side of the vehicle from the first cowl front ends 11*fe* to the left and right outermost portions 11*ue*, and is gradually decreased toward left and right rear ends 11*re* on a rear side from the left and right outermost portions 11*ue* to an area in the vicinity of a rear end of the tail light 20 while being suitably bent.

The left and right outermost portions 11*ue* of the first cowl 11 project toward left and right outermost sides of the rear cowl 10 in the vehicle width direction, and the first cowl 11 forms a major part of the upper cowl 10*u* compared to the small second cowl 12 which only covers the rear notched portion 11*rk*.

The first cowl 11 is, as viewed in a side view, a plate-like member which is inclined rearward and upward in the longitudinal direction of the vehicle. To be more specific, the first cowl 11 includes: a steeply inclined portion which is inclined at a steep angle from the first cowl front ends 11*fe* to an approximately center portion of the first cowl 11 and covers a rear portion of the rider's seat 7*f*; and a gently inclined portion which is gently inclined in a straight-line shape from the approximately center portion to the rear ends 11*re* and forms the upper cowl upper portions 10*uu* and surrounds the pillion's seat 7*r*.

On vertically connecting portions 10*b* of the first cowl 11 which extend along the seat frames 2*c*, upper engaging portions 11*b* which engage with lower engaging portions 13*b* of a third cowl 13 described later are formed. A plurality of upper engaging portions 11*b* are formed along an outer periphery of the first cowl 11. To be more specific, the upper engaging portion 11*b* has, for example, two hook-shaped upper connecting engaging portions 11*ba*, 11*bb* which extend in the longitudinal direction of the vehicle along the outer periphery of the first cowl 11 on a front side. The hook-shaped upper connecting engaging portions 11*ba*, 11*bb* are formed into a so-called hook shape such that the upper connecting engaging portions 11*ba*, 11*bb* project downward approximately orthogonal to a flat surface portion of the steeply inclined portion having a steep angle, and front ends of the upper connecting engaging portions 11*ba*, 11*bb* extend toward a front side.

In the first cowl 11, first front support portions 11*tf* formed adjacently to the first cowl front ends 11*fe* on both left and right sides are fixed to third front support portions 13*tf* of a third cowl 13 of the lower cowl 10*d* described later (see FIGS. 8A and 8B). First intermediate support portions 11*ti* formed on an inner side of the center opening 11*ch* are supported by a cross member which is formed on the seat frames 2*c*.

Figure 6A:
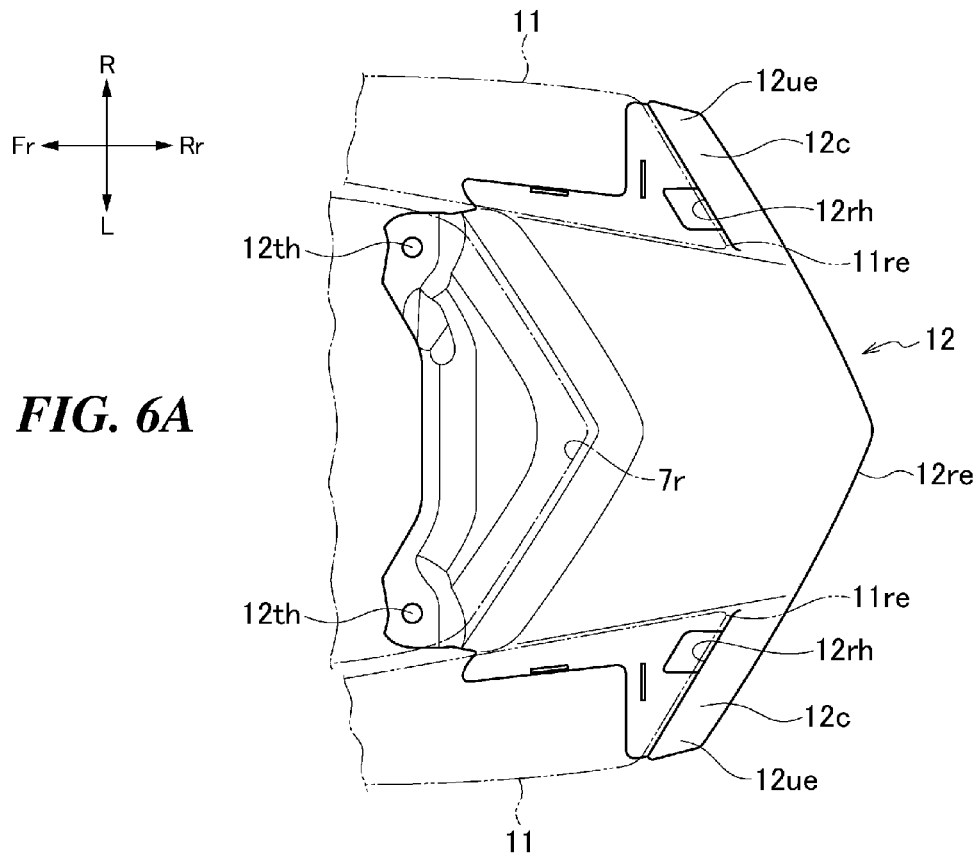
FIGS. 6A and 6B are views of a second cowl which forms an upper cowl of the rear cowl of the saddle-ride type vehicle shown in FIG. 1.
Figure 6B:
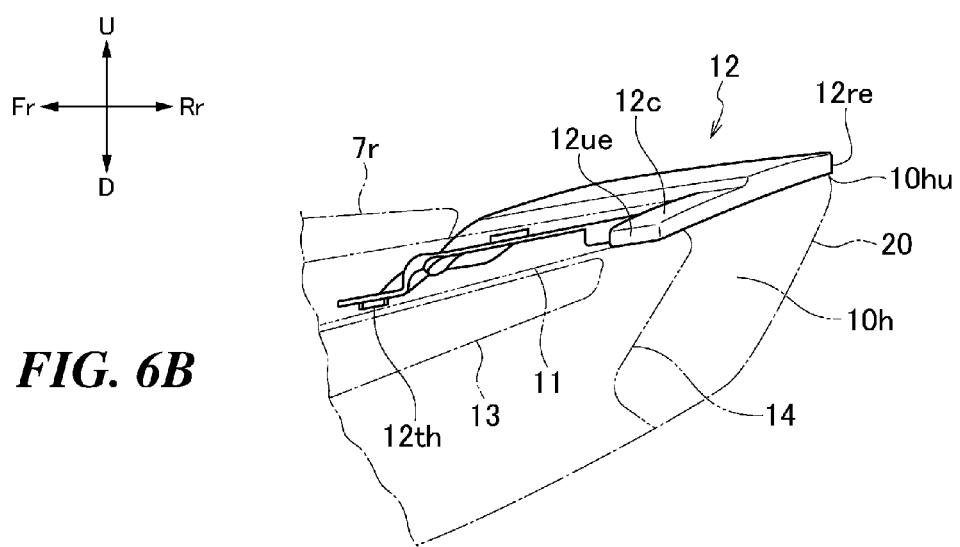

As shown in FIGS. 6A and 6B, and as described previously, the second cowl 12 is a plate-like member which is configured to close the rear notched portion 11*rk* of the first cowl 11. To be more specific, projecting portions 12*c* which project toward left and right sides are formed on a rear end portion of the second cowl 12, and a rear end edge 12*re* including the projecting portion 12*c* is formed into a shape where the rear end edge 12*re* is inclined toward both left and right sides and toward a front side such that a center of the rear end edge 12*re* in a width direction forms a top rear end. Front connecting portions 12*th* which are connected to the rear connecting portions 11*th* of the first cowl 11 are formed on both left and right sides of a front end portion of the second cowl 12. The second cowl 12 is assembled such that the projecting portions 12*c* are brought into contact with the rear ends 11*re* of the first cowl 11 and cover rear surfaces of the rear ends 11*re*. Recessed portions 12*rh* which are indented toward a rear side are formed on front surface sides of the projecting portions 12*c*, and engaging projections 11*rf* (see FIG. 5A) formed on the rear ends 11*re* of the first cowl 11 engage with the recessed portions 12*rh*.

Figure 11:
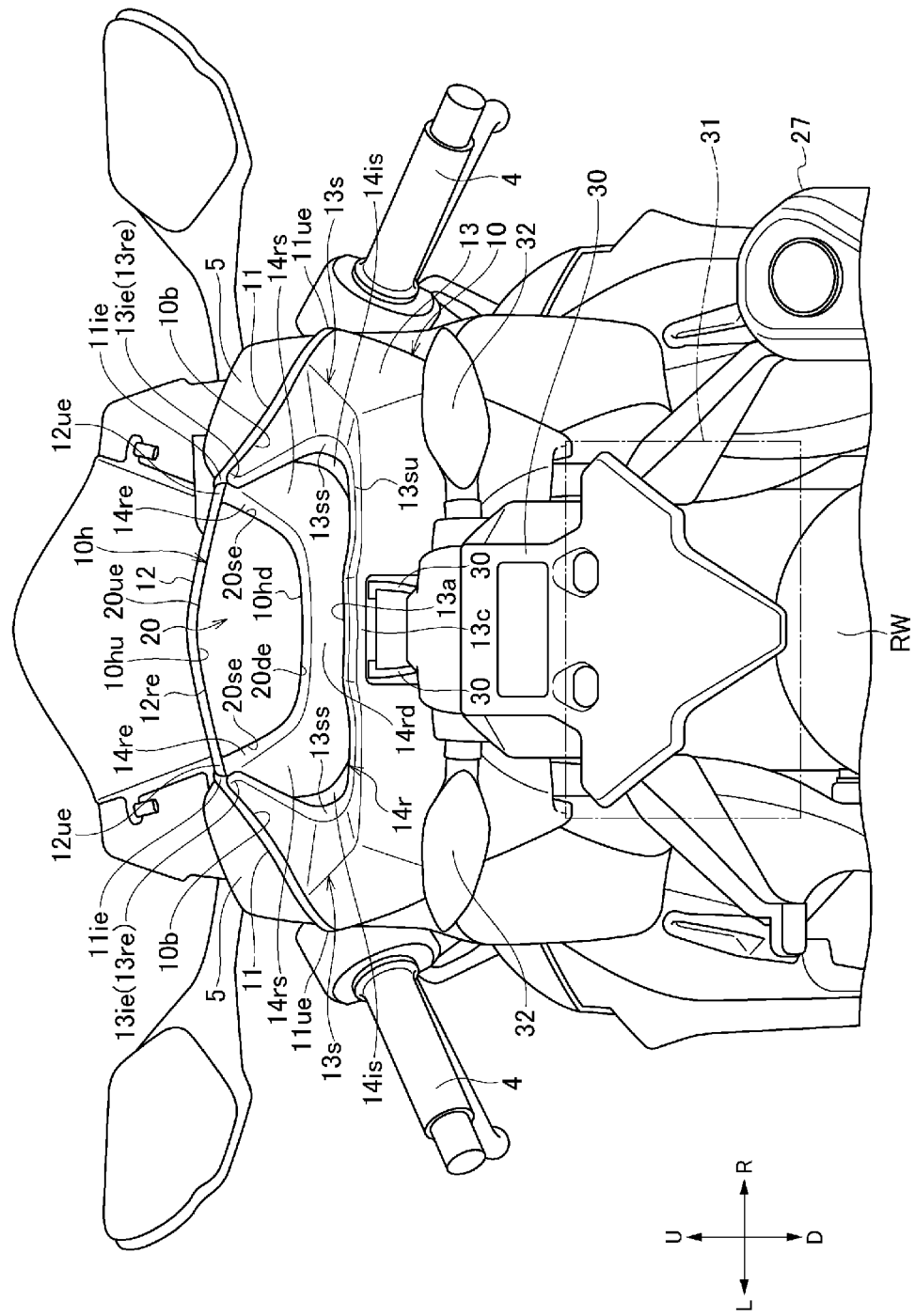
FIG. 11 is a back view of the saddle-ride type vehicle shown in FIG. 1 as viewed from a rear side.

As viewed in a back view, a rear end edge 12*re* of the second cowl 12 forms an opening upper edge portion 10*hu* of the opening 10*h* for the tail light 20 (see FIG. 11).

The lower cowl 10*d* includes a third cowl 13 and a fourth cowl 14 which are vertically assembled to each other. That is, the lower cowl 10*d* has the structure where the fourth cowl 14 closes the notched portions 11*fk*, 11*rk* formed in the front portion and the rear portion of the third cowl 13 described later by assembling the third cowl 13 and the fourth cowl 14 to each other such that the fourth cowl 14 overlaps with the third cowl 13.

Figure 7:
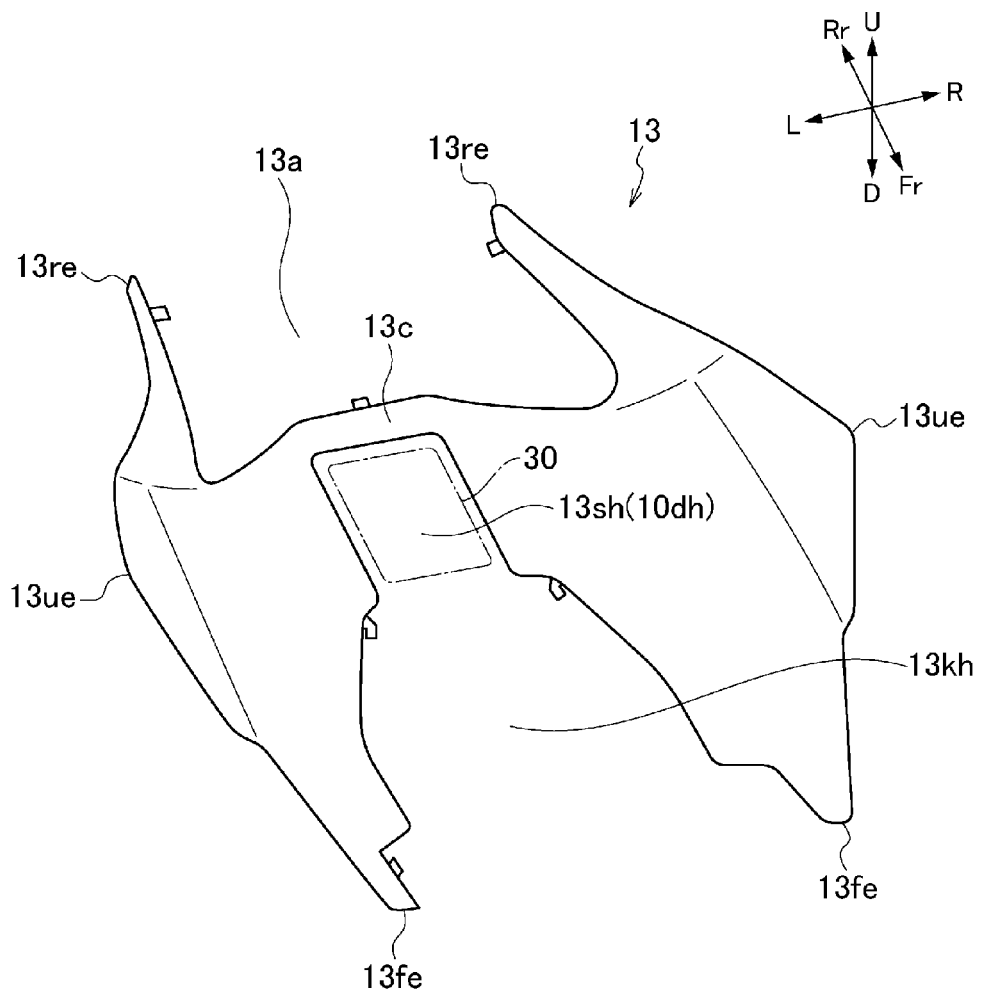
FIG. 7 is a perspective view of a third cowl which forms a lower cowl of the rear cowl of the saddle-ride type vehicle shown in FIG. 1 as viewed from an oblique lower position.

As shown in FIG. 7, the third cowl 13 has the following structure. The third cowl 13 is formed into a curved shape such that the third cowl 13 projects toward a lower side in transverse cross section. The third cowl 13 has: a front notched portion 13*kh* which is notched such that the front notched portion 13*kh* largely opens toward a front side; and a U-shaped recessed portion 13*a* which is formed such that the U-shaped recessed portion 13*a* opens toward a rear side with a size smaller than a size of the front notched portion 13*kh*. The third cowl 13 covers both left and right side surfaces of the seat frames 2*c*. That is, the third cowl 13 has the left and right symmetrical structure where the third cowl connecting portion 13*c* which remains between the front notched portion 13*kh* and the U-shaped recessed portion 13*a* connects the left and the right portions of the third cowl 13 which cover lower sides of the seat frames 2*c*. As viewed in a side view, the U-shaped recessed portion 13*a* has an approximately U shape formed by deeply cutting the third cowl 13 toward a front side from third cowl rear ends 13*re* (see FIG. 8B).

Figure 8A:
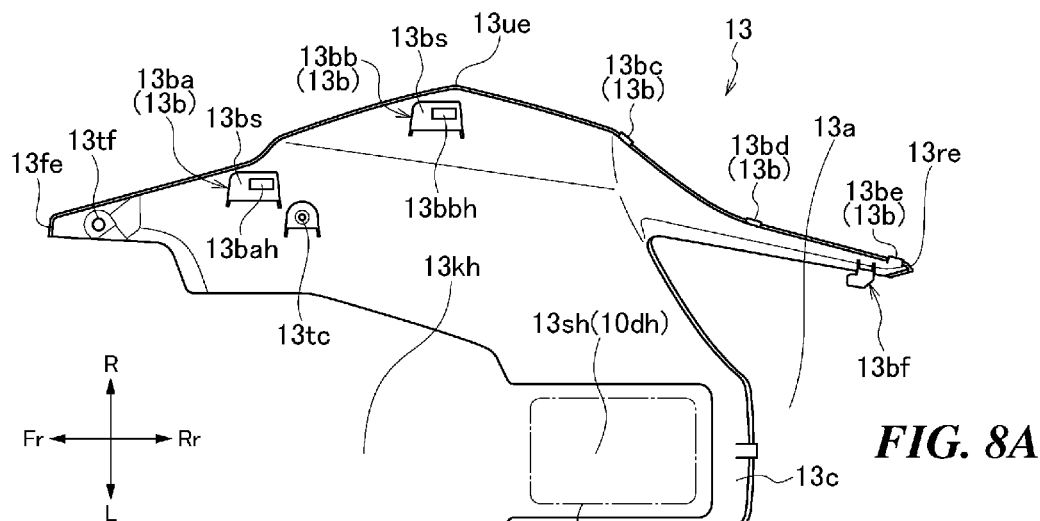
FIGS. 8A and 8B are views of the third cowl shown in FIG. 7.

As shown in FIG. 8A, the third cowl 13 has a shape where outer peripheries of the third cowl 13 on left and right outer sides approximately agree with outer peripheries of the first cowl 11 on left and right outer sides as viewed in a plan view (see FIG. 5B). That is, third cowl front ends 13*fe* disposed on both left and right sides of the front notched portion 13*kh* oppositely face the first cowl front ends 11*fe* of the first cowl 11, and a width of the third cowl 13 is gradually increased in a width direction as the third cowl 13 extends rearward such that left and right outermost portions 13*ue* of the third cowl 13 opposedly face the left and right outermost portions 11*ue* of the first cowl 11, and the width of the third cowl 13 is gradually decreased as the third cowl 13 extends from the third cowl left and right outermost portions 13*ue* to the third cowl rear ends 13*re*.

The U-shaped recessed portion 13*a* has a shape, as viewed in a plan view, where both left and right sides are cut more deeply as the U-shaped recessed portion 13*a* extends toward the third cowl connecting portion 13*c*. The front notched portion 13*kh* is formed such that a front side of the front notched portion 13*kh* has a large width, and a rectangular hole 13*sh* having a narrow-width rectangular shape is formed in a rear side of the front notched portion 13*kh*. The rectangular hole 13*sh* forms a through portion 10*dh* into which a license stay 30 is inserted.

Figure 8B:
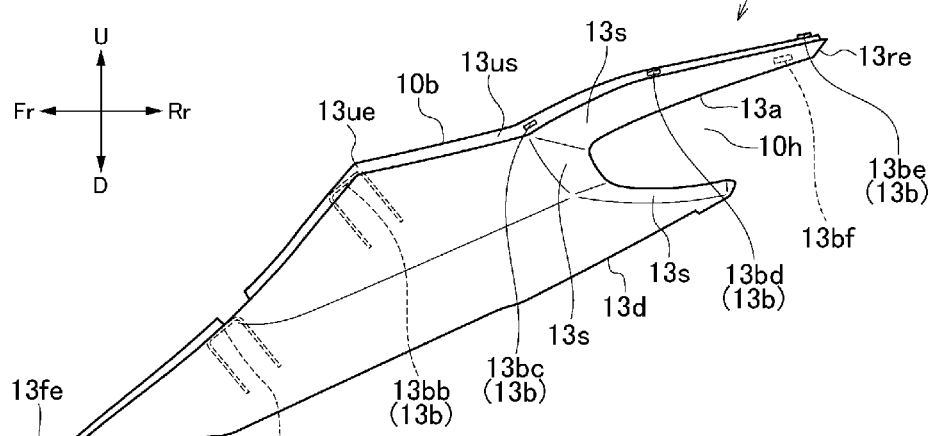

As shown in FIG. 8B, as viewed in a side view, an upper edge portion of the third cowl 13 forms the vertically connecting portion 10*b* in cooperation with the first cowl 11, and a lower edge 13*d* of the third cowl 13 is inclined rearward and upward toward a rear side of the vehicle such that the lower edge 13*d* is positioned below the seat frame 2*c*. Along the vertically connecting portion 10*b*, a lower engaging portion 13*b* which overlaps with the upper engaging portion 11*b* of the above-mentioned first cowl 11 from a lower side is disposed.

The lower engaging portion 13*b* engages with the upper engaging portion 11*b* of the first cowl 11. To be more specific, the lower engaging portion 13*b* includes lower connecting engaging portions 13*ba*, 13*bb* which correspond to the above-mentioned two hook-type upper connecting engaging portions 11*ba*, 11*bb* (see FIGS. 5A and 5B) which form the upper engaging portion 11*b*. In the third cowl 13, the lower connecting engaging portions 13*ba*, 13*bb* project toward the vertical connecting portions 10*b*, reach a height of the vertical connecting portions 10*b*, and form flat surfaces 13*bs* on upper ends of the vertical connecting portions 10*b* (see FIG. 8A). Rectangular engaging holes 13*bah*, 13*bbh* which are elongated in the longitudinal direction are formed in the flat surfaces 13*bs*. On a rear side of the lower connecting engaging portions 13*bb*, three connecting engaging projections 13*bc*, 13*bd*, 13*be* are formed in an outwardly projecting manner toward the outside on a third cowl upper edge portion 13*us* which approximately traces the vertical connecting portion 10*b* at suitable intervals. Hook-type engaging portions 13*bf* which engage with engaging hole portions 14*rh* of the fourth cowl 14 (see FIGS. 10A and 10B) are formed in a projecting manner on an inner surface of the third cowl 13 in the vicinity of the connecting engaging projections 13*be*.

In the third cowl 13, as described previously, the third front support portions 13*tf* of the front portion are fixed to the first front support portions 11*tf* of the first cowl 11, and third intermediate support portions 13*tc* disposed behind the third front support portions 13*tf* are fixed to the rear fender 42.

Figure 9:
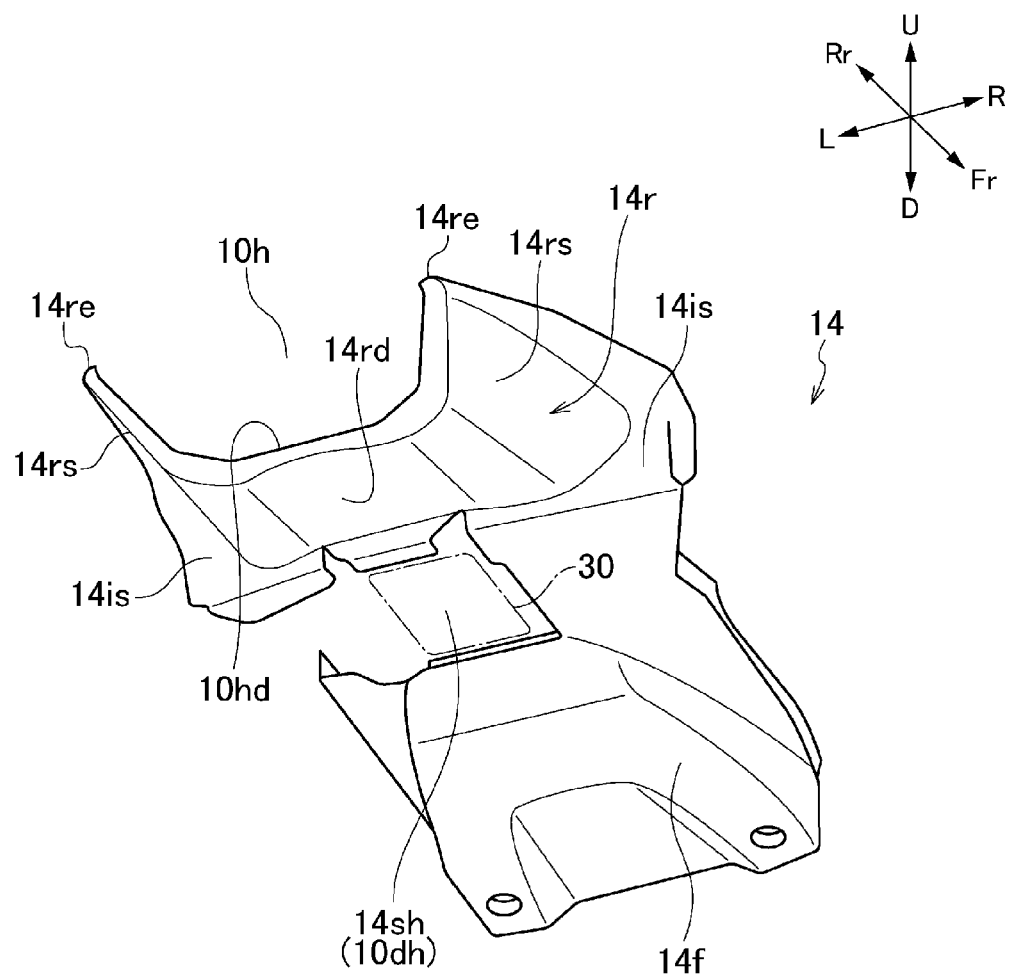
FIG. 9 is a perspective view of a fourth cowl which forms the lower cowl of the rear cowl of the saddle-ride type vehicle shown in FIG. 1 as viewed from an oblique lower position.
Figure 10A:
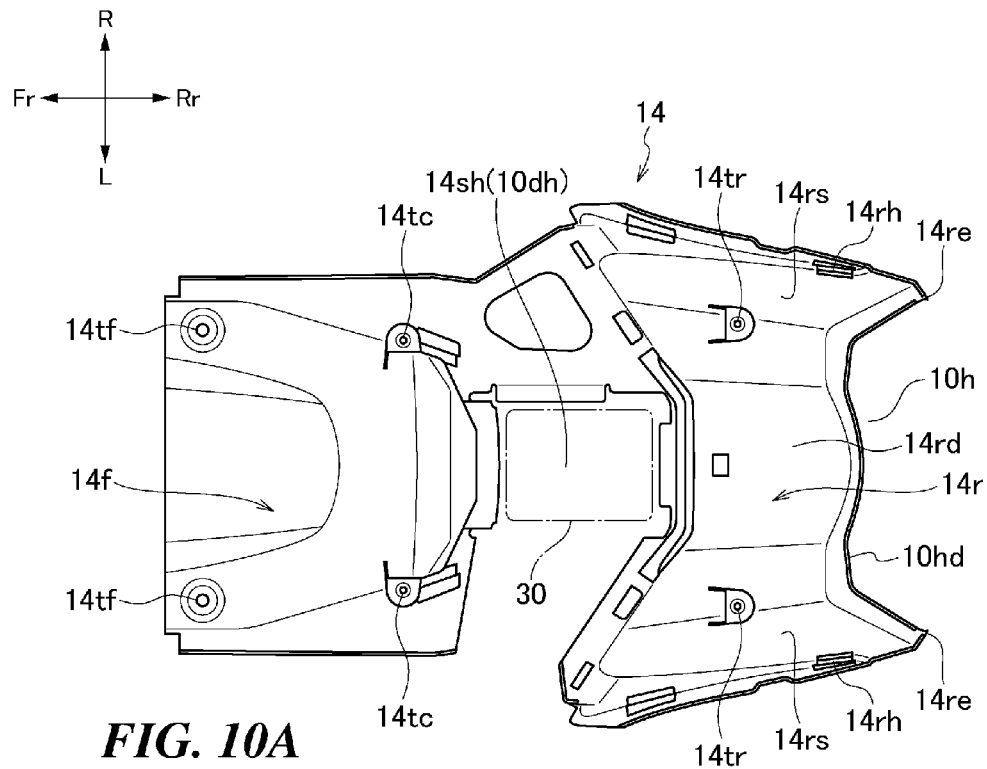
FIGS. 10A and 10B are views of the fourth cowl shown in FIG. 9.
Figure 10B:
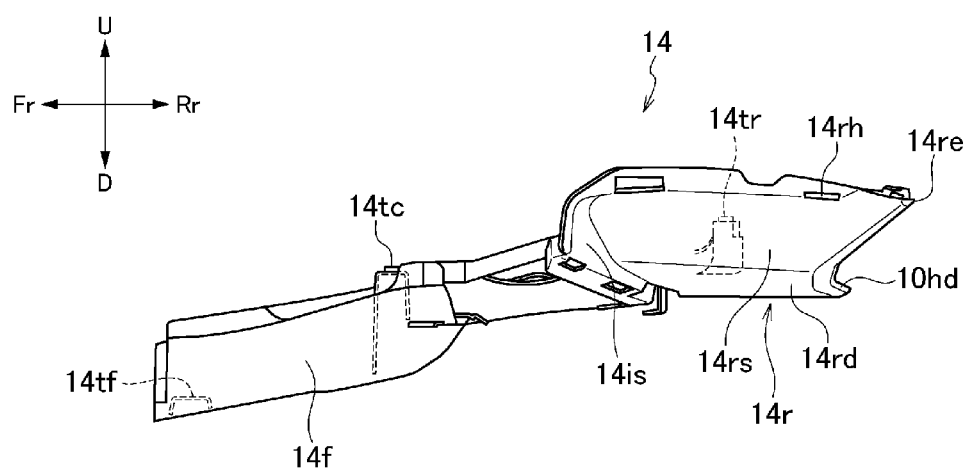

As shown in FIG. 9, the fourth cowl 14 has the structure by which the front notched portion 13*kh* and the U-shaped recessed portion 13*a* (see FIG. 7) of the third cowl 13 are closed. To be more specific, the fourth cowl 14 includes: a front exposed portion 14*f* which closes a front side of the front notched portion 13*kh* while bulge downward; a side directional notched portion 14*sh* which corresponds to the rectangular hole 13*sh* and opens a left side thereof; and a rear exposed portion 14*r* which closes the U-shaped recessed portion 13*a*. The rear exposed portion 14*r* is formed into an approximately U shape by left and right side wall portions 14*rs* and a bottom portion 14*rd*. The rear exposed portion 14*r* closes left and right side surface sides and a bottom surface side of the U-shaped recessed portion 13*a* while leaving the opening 10*h* for mounting the tail light 20. The side wall portions 14*rs* are formed such that a distance between the side wall portions 14*rs* in a vehicle width direction is decreased in a direction toward a rear side of the vehicle from a front side of the vehicle (see FIG. 11). On a boundary portion between a side directional notched portion 14*sh* and the rear exposed portion 14*r*, narrowing flat surface portions 14*is* which gradually converge the side wall portions 14*rs* toward the inside in the vehicle width direction are formed. As viewed in a back view, a rear end edge of the rear exposed portion 14*r* forms an opening lower edge portion 10*hd* of the opening 10*h* through which the tail light 20 is exposed (see FIG. 11). The side directional notched portion 14*sh* forms a through portion 10*dh* in cooperation with the rectangular hole 13*sh* of the third cowl 13.

In the fourth cowl 14, engaging hole portions 14*rh* are formed on rear upper portions of the side wall portions 14*rs*, and the engaging hole portions 14*rh* engage with the hook-type engaging portions 13*bf* of the third cowl 13 as described previously (see FIGS. 8A and 8B). In the fourth cowl 4, fourth front support portions 14*tf*, fourth intermediate support portions 14*tc* and fourth rear support portions 14*tr* which are mounted on both left and right sides of a front portion, a middle-stage portion and a rear portion are fixed to the rear fender 42.

The upper cowl 10*u* and the lower cowl 10*d* formed as described above are made to overlap with each other in the vertical direction at the vertical connecting portions 10*b* by making the upper engaging portions 11*b* of the first cowl 11 and the lower engaging portions 13*b* of the third cowl 13 engage with each other. In overlapping the upper cowl 10*u* and the lower cowl 10*d* at the vertical connecting portion 10*b*, the connecting engaging projections 13*bc*, 13*bd*, 13*be* are brought into contact with an inner side of an outer peripheral portion of the first cowl 11. At this stage of the operation, the hook-type upper connecting engaging portions 11*ba*, 11*bb* are inserted into the engaging holes 13*bah*, 13*bbh* of the lower connecting engaging portions 13*ba*, 13*bb*. Accordingly, for example, by shifting the first cowl 11 toward a front side, the hook-type upper connecting engaging portions 11*ba*, 11*bb* are latched and locked to the engaging holes 13*bah*, 13*bbh*.

As shown in FIG. 11, in a state where the rear cowl 10 is assembled, in the second cowl 12, the opening upper edge portion 10*hu* of the opening 10*h* is formed in an edge shape which follows the shape of an upper edge 20*ue* of the tail light 20 as viewed in a back view. The opening upper edge portion 10*hu* extends obliquely and downward toward the left and right end portions 12*ue* with a top thereof disposed at the center in the vehicle width direction. As viewed in a back view, the first cowl 11 extends obliquely and downward toward left and right outer sides from the first cowl left and right inner end portions 11*ie* disposed adjacently to the left and right outer sides of the left and right end portions 12*ue* of the second cowl 12, and extends to the left and right outermost portions 11*ue*. The third cowl 13 is formed such that the third cowl 13, as viewed in a back view, bulges laterally so as to be connected to the left and right outermost portions 11*ue* from the third cowl left and right inner end portions 13*ie* (third cowl rear ends 13*re*) disposed adjacently to a lower side of the first cowl left and right inner end portions 11*ie* so that the left and right side surfaces can be also viewed from a rear side.

The third cowl 13 includes, as viewed in a back view, U-shaped recessed portion outer peripheral portion 13*s* which is inclined toward an inner side from an outer side of the vehicle in a direction toward the U-shaped recessed portion 13*a* on an outer periphery of the U-shaped recessed portion 13*a*. Inside the U-shaped recessed portion outer peripheral portion 13*s*, a ridge 13*su* is formed such that the ridge 13*su* surrounds the U-shaped recessed portion 13*a*. A flat surface 13*ss* which is continuously formed with the U-shaped recessed portion 13*a* is formed on the U-shaped recessed portion outer peripheral portions 13*s* via the ridge 13*su* which surrounds the U-shaped recessed portion 13*a*.

As described previously, the U-shaped recessed portion 13*a* is formed such that the U-shaped recessed portion 13*a* expands in a vehicle width direction as the U-shaped recessed portion 13*a* extends downward as viewed in a back view, and the rear exposed portion 14*r* of the fourth cowl 14 closes the U-shaped recessed portion 13*a* in a state where the opening lower edge portion 10*hd* of the opening 10*h* surrounds the lower edge 20*de* and the side edges 20*se* of the tail light 20.

That is, the opening 10*h* defined by the opening upper edge portion 10*hu* and the opening lower edge portion 10*hd* is formed by the second cowl 12 which extends in an edge shape between the left and right end portions 12*ue* and the left and right side wall portions 14*rs* and the bottom portion 14*rd* of the fourth cowl 14 which connects the left and right upper end portions 14*re* of the fourth cowl 14 connected to the left and right end portions 12*ue* in an approximately U shape, and the tail light 20 is exposed through the opening 10*h*.

The license stay 30 passes through the through portion 10*dh* of the lower cowl 10*d*, and extends toward a rear side of the rear cowl 10 from a lower side of the tail light 20 as viewed in a back view, and the third cowl connecting portion 13*c* which connects left and right portions in the vehicle width direction of the third cowl 13 is positioned above the license stay 30.

As has been described heretofore, according to the saddle-ride type vehicle 1 of this embodiment, the upper cowl 10*u* includes: the first cowl 11; and the second cowl 12 which is connected to the rear side of the first cowl 11 and forms an opening upper edge portion 10*hu* of an opening 10*h* through which the tail light 20 is exposed, the lower cowl 10*d* includes: the third cowl 13; and the fourth cowl 14 which is connected to the rear side of the third cowl 13 and forms an opening lower edge portion 10*hd* of the opening 10*h*, and the first cowl 11 and the third cowl 13 are connected to each other by the vertical connecting portion 10*b* which extends in a longitudinal direction of the vehicle and extend in the longitudinal direction of the vehicle. Accordingly, the upper cowl 10*u* and the lower cowl 10*d* can be favorably connected to each other.

The U-shaped recessed portion 13*a* having an approximately U shape where the third cowl rear end 13*re* is opened as viewed in a side view is formed on the third cowl 13 below the vertical connecting portion 10*b*, and the fourth cowl 14 forms the opening lower edge portion 10*hd* while covering the U-shaped recessed portion 13*a* as viewed in a side view and hence, the most portion of the opening 10*h* through which the tail light 20 is exposed can be formed by the fourth cowl 14. As a result, it is possible to adjust the rear portion structure of the saddle-ride type vehicle 1 to the shape of the tail light 20 by merely changing the shape of the rear portion of the fourth cowl 14. As a result, the shape of the tail light 20 can be easily changed.

The second cowl 12 is formed in an edge shape such that the opening upper edge portion 10*hu* follows an upper edge 20*ue* of the tail light 20 in shape as viewed in a back view and hence, the tail light can be disposed at the high position.

The first cowl 11 is configured such that the first cowl 11 extends toward left and right outer sides and downward from the first cowl left and right inner end portions 11*ie* disposed laterally outside of and adjacently to left and right ends of the second cowl 12 thus forming the left and right outermost portions 11*ue* as viewed in a back view, the third cowl 13 is configured such that the third cowl 13 bulges laterally so as to be connected to the left and right outermost portions 11*ue* from the third cowl left and right inner end portions 13*ie* disposed below and adjacently to the first cowl left and right inner end portions 11*ie*, and the U-shaped recessed portion 13*a* expands in a vehicle width direction as the U-shaped recessed portion 13*a* extends downward as viewed in a back view. The fourth cowl 14 is configured such that the fourth cowl 14 closes the U-shaped recessed portion 13*a* while surrounding the lower edge 20*de* and side edges 20*se* of the tail light 20 as viewed in a back view. Accordingly, it is possible to adjust the rear portion structure of the vehicle to the shape of the tail light 20 by merely changing a shape of a portion of the fourth cowl 14 which surrounds the tail light 20 and hence, the degree of freedom in selecting the shape of the tail light can be enhanced. The third cowl 13 is disposed such that the third cowl 13 appears on both left and right ends of the tail light 20 as viewed in a back view and hence, design property of an external appearance of the rear portion structure of the saddle-ride type vehicle 1 from a rear side can be enhanced.

The third cowl 13 includes the third cowl connecting portion 13*c* which extends in the vehicle width direction above the through portion 10*dh* of the license stay 30 and has left and right portions thereof connected to each other. Accordingly, the third cowl 13 closes the opening of the rear cowl 10 on a rear side thus preventing the intrusion of water. The third cowl connecting portion 13*c* forms the integral structure by connecting the left and right portions of the third cowl 13 in the vehicle width direction and hence, the number of parts can be decreased whereby assembling property of the third cowl 13 is enhanced.

The third cowl 13 includes the U-shaped recessed portion outer peripheral portion 13*s* which is inclined toward the inner side from the outer side of the vehicle in a direction toward the U-shaped recessed portion 13*a* on the outer periphery of the U-shaped recessed portion 13*a* as viewed in a back view, and the U-shaped recessed portion outer peripheral portion 13*s* has the flat surface 13*ss* continuously formed with the U-shaped recessed portion 13*a* via the ridge 13*su* which surrounds the U-shaped recessed portion 13*a*. Accordingly, design property of an external appearance of the rear portion structure of the saddle-ride type vehicle 1 can be enhanced while enhancing the rigidity of the surrounding of the U-shaped recessed portion 13*a*.

The fourth cowl 14 has the rear exposed portion 14*r* having an approximate U shape which is positioned in the U-shaped recessed portion 13*a*, and is formed by left and right side wall portions 14*rs* and the bottom portion 14*rd* as viewed in a back view, and a distance in a vehicle width direction between the left and right side wall portions 14*rs* is decreased toward the rear side of the vehicle from a front side of the vehicle. Accordingly, the rear portion of the fourth cowl 14 which closes the U-shaped recessed portion 13a can be formed into the structure having a narrow width whereby downsizing and reduction of weight of the lower cowl 10d can be realized.

The upper cowl 10u is formed in an approximately straight line shape where an upper cowl upper portion 10uu extends in a longitudinal direction of the vehicle as viewed in a side view, the lower cowl 10d is formed in an approximately straight line shape where the lower cowl lower portion 10dd extends in the longitudinal direction of the vehicle, and a distance between the lower cowl lower portion 10dd and the upper cowl upper portion 10uu is decreased as the lower cowl lower portion 10dd extends toward a rear side of the vehicle as viewed in a side view. The lens outer surface 20s of the tail light 20 is disposed between the upper cowl upper portion 10uu and the lower cowl lower portion 10dd, and the upper end 20su of the lens outer surface 20s is disposed downward behind the lower end 20sd of the lens outer surface 20s as viewed in a side view. Accordingly, the rear cowl 10 can be formed in a tapered shape toward a rear side and hence, downsizing and reduction of weight of the rear cowl 10 can be realized.

The present invention is not limited to the above-mentioned embodiment and the present invention can be modified or improved as desired.

In this embodiment, the description has been made with respect to the motorcycle. However, the present invention is also applicable to other saddle-ride type vehicle.

The invention claimed is:

1. A rear portion structure of a saddle riding vehicle (1) including:
    seat frames (2c) inclined rearward and upward toward a rear side of the vehicle and supporting a riding seat (7);
    a tail light (20) supported on rear ends of the seat frames (2c); and
    a rear cowl (10) having an upper cowl (10u) which covers upper surfaces of the seat frames (2c) disposed below a rear portion of the riding seat (7) and a lower cowl (10d) which covers lower surfaces of the seat frames (2c),
    wherein the upper cowl (10u) includes: a first cowl (11); and a second cowl (12) which is connected to a rear side of the first cowl (11) and forms an opening upper edge portion (10hu) of an opening (10h) through which the tail light (20) is exposed,
    wherein the lower cowl (10d) includes: a third cowl (13); and a fourth cowl (14) which is connected to a rear side of the third cowl (13) and forms an opening lower edge portion (10hd) of the opening (10h),
    wherein the first cowl (11) and the third cowl (13) are connected to each other by a vertical connecting portion (10b) which extends in a longitudinal direction of the vehicle,
    wherein a U-shaped recessed portion (13a) having an approximately U shape which is opened at a rear end (13re) thereof as viewed in a side view is formed on the third cowl (13) below the vertical connecting portion (10b), and
    wherein the fourth cowl (14) forms the opening lower edge portion (10hd) while covering the U-shaped recessed portion (13a) as viewed in a side view.

2. The structure of claim 1,
    wherein the second cowl (12) is formed in an edge shape such that the opening upper edge portion (10hu) follows an upper edge (20ue) of the tail light (20) in shape as viewed in a back view,
    wherein the first cowl (11) is configured such that the first cowl (11) extends toward left and right outer sides and downward from first cowl left and right inner end portions (11ie) disposed laterally outside of and adjacently to left and right ends of the second cowl (12) thus forming left and right outermost portions (11ue) as viewed in a back view,
    wherein the third cowl (13) is configured such that the third cowl (13) bulges laterally so as to be connected to the left and right outermost portions (11ue) from third cowl left and right inner end portions (13ie) disposed below and adjacently to the first cowl left and right inner end portions (11ie), and the U-shaped recessed portion (13a) expands in a vehicle width direction as the U-shaped recessed portion (13a) extends downward as viewed in a back view, and
    wherein the fourth cowl (14) is configured such that the fourth cowl (14) closes the U-shaped recessed portion (13a) while surrounding a lower edge (20de) and side edges (20se) of the tail light (20) as viewed in a back view.

3. The structure of claim 1, further including
    a license stay (30) which has a front end thereof supported by the seat frames (2c), extends toward a rear side of the vehicle while passing through a through portion (10dh) of the rear cowl (10), and supports a license plate (31) on a rear end thereof,
    wherein the third cowl (13) includes a third cowl connecting portion (13c) which extends in the vehicle width direction above the through portion (10dh) of the license stay (30) and has left and right portions thereof connected to each other.

4. The structure of claim 3,
    wherein the upper cowl (10u) is formed in an approximately straight line shape where an upper cowl upper portion (10uu) extends in a longitudinal direction of the vehicle as viewed in a side view,
    wherein the lower cowl (10d) is formed in an approximately straight line shape where a lower cowl lower portion (10dd) extends in the longitudinal direction of the vehicle, and a distance between the lower cowl lower portion (10dd) and the upper cowl upper portion (10uu) is decreased as the lower cowl lower portion (10dd) extends toward a rear side of the vehicle as viewed in a side view, and
    wherein a lens outer surface (20s) of the tail light (20) is disposed between the upper cowl upper portion (10uu) and the lower cowl lower portion (10dd), and an upper end (20su) of the lens outer surface (20s) is disposed downward behind a lower end (20sd) of the lens outer surface (20s) as viewed in a side view.

5. The structure of claim 1,
    wherein the third cowl (13) includes a U-shaped recessed portion outer peripheral portion (13s) which is inclined toward an inner side from an outer side of the vehicle in a direction toward the U-shaped recessed portion (13a) on an outer periphery of the U-shaped recessed portion (13a) as viewed in a back view, and
    wherein the U-shaped recessed portion outer peripheral portion (13s) has a flat surface (13ss) continuously formed with the U-shaped recessed portion (13a) via a ridge (13su) which surrounds the U-shaped recessed portion (13a).

6. The structure of claim 5,
    wherein the fourth cowl (14) has a rear exposed portion (14r) having an approximately U shape which is positioned in the U-shaped recessed portion (13a), and is formed by left and right side wall portions (14rs) and a bottom portion (14rd) as viewed in a back view, and wherein a distance in a vehicle width direction between the left and right side wall portions (14*rs*) is decreased toward a rear side of the vehicle from a front side of the vehicle.

* * * * *